United States Patent
Fujimori

(10) Patent No.: US 6,628,470 B1
(45) Date of Patent: Sep. 30, 2003

(54) MAGNETIC DISK APPARATUS SLOWING DOWN ROTATION SPEED OF DISK IN IDLE TIME

(75) Inventor: Takemichi Fujimori, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/518,674

(22) Filed: Mar. 3, 2000

(30) Foreign Application Priority Data

Sep. 16, 1999 (JP) .......................................... 11-262046

(51) Int. Cl.[7] .............................................. G11B 15/46
(52) U.S. Cl. ...................... 360/73.03; 360/69; 360/71; 360/75
(58) Field of Search ................................ 360/73.03, 69, 360/71, 75, 235.5, 235.6, 235.7, 235.8, 235.9, 236, 236.1, 236.2, 236.3

(56) References Cited

U.S. PATENT DOCUMENTS

| | | | |
|---|---|---|---|
| 5,412,519 A | * | 5/1995 | Buettner et al. .......... 360/73.03 |
| 5,521,896 A | * | 5/1996 | Bajorek et al. ............ 360/69 X |
| 5,673,242 A | * | 9/1997 | Lin ...................... 360/73.03 X |
| 5,764,430 A | * | 6/1998 | Ottesen et al. ............ 360/73.03 |
| 5,774,292 A | * | 6/1998 | Georgiou et al. ......... 360/73.03 |
| 5,787,292 A | * | 7/1998 | Ottesen et al. ............. 360/71 X |
| 6,052,791 A | * | 4/2000 | Chen et al. ................. 711/4 X |
| 6,075,683 A | * | 6/2000 | Harwood et al. ........... 360/135 |
| 6,198,590 B1 | * | 3/2001 | Codilian et al. ......... 360/73.03 |
| 6,285,521 B1 | * | 9/2001 | Hussein .................... 360/73.03 |

FOREIGN PATENT DOCUMENTS

| | | |
|---|---|---|
| JP | 10-50020 | 2/1998 |
| JP | 11-45495 | 2/1999 |
| JP | 11191262 A | * 7/1999 |

OTHER PUBLICATIONS

Machine Translation into English of JP10–50020, Hidekazu et al., "Magnetic Head Slider and Magnetic Disk Device Having the Same," Feb. 20, 1998, Patent Abstracts of Japan, entire document.*

* cited by examiner

Primary Examiner—David Hudspeth
Assistant Examiner—Mitchell Slavitt
(74) Attorney, Agent, or Firm—Mattingly, Stanger & Malur, P.C.

(57) ABSTRACT

A magnetic disk apparatus includes a magnetic head slider in which a magnetic head element is mounted, a magnetic disk to which recording and reproduction of data are made by means of the magnetic head element, a spindle motor which rotatably supports the magnetic disk, and a controller for controlling the rotational speed of the magnetic disk in each proper idle time that recording or reproduction is not made after completion of recording or reproduction to the magnetic disk by the magnetic head element until next recording or reproduction time.

4 Claims, 4 Drawing Sheets

MPU : MICRO PROCESSING UNIT
HDC : HARD DISK CONTROLLER

MAGNETIC DISK APPARATUS SLOWING DOWN ROTATION SPEED OF DISK IN IDLE
TIME

BACKGROUND OF THE INVENTION

The present invention relates to a magnetic disk apparatus and more particularly to a magnetic disk apparatus attaining reduction of power consumption while maintaining reliability and performance.

Heretofore, a magnetic disk apparatus or a magnetic hard disk drive has a narrow gap (hereinafter referred to as "flying height") between a magnetic head slider and a magnetic disk about 20 to 50 nm required from high recording density. The narrowness of the flying height contributes to improvement of the recording density but increases a possibility that the magnetic head slider comes into contact with the magnetic head. Accordingly, there is a possibility that data recorded on the magnetic disk is destroyed due to crash at the worst.

On the other hand, the magnetic disk apparatus has a rotational speed of the magnetic disk increased to about 10,000 rpm due to a demand for high performance. The increased rotational speed of the magnetic disk contributes to improvement of the performance but increases power consumption of the magnetic disk apparatus and further there is a possibility that heat generated by the magnetic disk apparatus is increased.

Further, in recent years, mobile computers having the portability regarded as important are used increasingly and it is desired that the power consumption is reduced when a magnetic disk is mounted in a note-type personal computer or the like.

In order to solve the above problems, the following techniques have been proposed.
(1) A technique that a magnetic disk is rotated at a rotational speed lower than that at the time of recording and reproduction when a magnetic head element or a read/write element does not make recording or reproduction to the magnetic disk (hereinafter referred to as an idle time). This technique reduces the rotational speed of the magnetic disk in the idle time and accordingly the power consumption of the magnetic disk apparatus can be reduced. This technique is described in, for example, JP-A-11-45495.
(2) A technique that the magnetic head slider has the flying characteristic that the flying height thereof is maximized at a rotational speed lower than a normal rotational speed of the magnetic disk and the rotational speed of the magnetic disk is reduced in the idle time. In this technique, since the magnetic head slider has the flying characteristic that the flying height thereof is maximized at the rotational speed lower than the normal rotational speed, the possibility that the magnetic head slider comes into contact with the magnetic disk is reduced even when the rotational speed of the magnetic disk is reduced. Accordingly, the reliability of the magnetic disk apparatus can be ensured. At the same time, in this technique, since the rotational speed of the magnetic disk is reduced in the idle time, the power consumption of the magnetic disk apparatus can be reduced. This technique is described in, for example, JP-A-10-50020.

The technique of reducing the rotational speed of the magnetic disk as described in (1) has a problem that the possibility that the magnetic disk comes into contact with the magnetic disk is increased and accordingly the reliability of the magnetic disk apparatus is influenced greatly although the rotational speed of the magnetic disk can be reduced to thereby reduce the consumption power of the magnetic disk apparatus.

(2) The technique that the magnetic head slider has the flying characteristic that the flying height thereof is maximized at the rotational speed lower than the normal rotational speed of the magnetic disk and the rotational speed of the magnetic disk is reduced in the idle time as described in (2) has a problem that a return time required until the writing/reading operation can be made actually after a processing instruction for writing/reading has been received during the idling period is long although the power consumption of the magnetic disk can be reduced while the reliability thereof can be maintained by the provision of the flying characteristic of the magnetic head slider that the flying height thereof is maximized at the rotational speed lower than the normal rotational speed.

SUMMARY OF THE INVENTION

It is an object of the present invention to solve the problems in the prior art by providing a magnetic disk apparatus attaining reduction of power consumption while maintaining reliability and performance.

In order to solve the problems, the present invention comprises the following structure.

According to the present invention, the magnetic disk apparatus including a magnetic head slider in which a magnetic head element is mounted, a magnetic disk to which recording and reproduction of data are made by means of the magnetic head element, and a spindle motor which rotatably supports the magnetic disk, comprises control means for controlling the rotational speed of the magnetic disk in each proper idle time that recording or reproduction is not made after completion of recording or reproduction to the magnetic disk by the magnetic head element until next recording or reproduction time.

Further, according to the present invention, in the magnetic disk apparatus including a magnetic head slider in which a magnetic head element is mounted, a magnetic disk to which recording and reproduction of data are made by means of the magnetic head element, and a spindle motor which rotatably supports the magnetic disk, the magnetic head slider has a flying characteristic that a flying height thereof is increased at a rotational speed of the magnetic disk lower than that at the time of the recording and reproduction, and the magnetic disk apparatus comprises control means for stepwise reducing the rotational speed of the magnetic disk in each proper idle time that recording or reproduction is not made after completion of recording or reproduction to the magnetic disk by the magnetic head element until next recording or reproduction time.

Furthermore, according to the present invention, in the magnetic disk apparatus including a magnetic head slider in which a magnetic head element is mounted, a magnetic disk to which recording and reproduction of data are made by means of the magnetic head element, and a spindle motor which rotatably supports the magnetic disk, the magnetic head slider has a flying characteristic that a flying height thereof is increased at a rotational speed of the magnetic disk lower than that at the time of the recording and reproduction, and the magnetic disk apparatus comprises control means for stepwise reducing the rotational speed of the magnetic disk in each proper idle time that recording or reproduction is not made after completion of recording or reproduction to the magnetic disk by the magnetic head element until next recording or reproduction time and setting a longest idle time at a rotational speed of the magnetic disk in which the flying height of the magnetic head slider is maximized.

DESCRIPTION OF THE EMBODIMENTS

Figure 1:
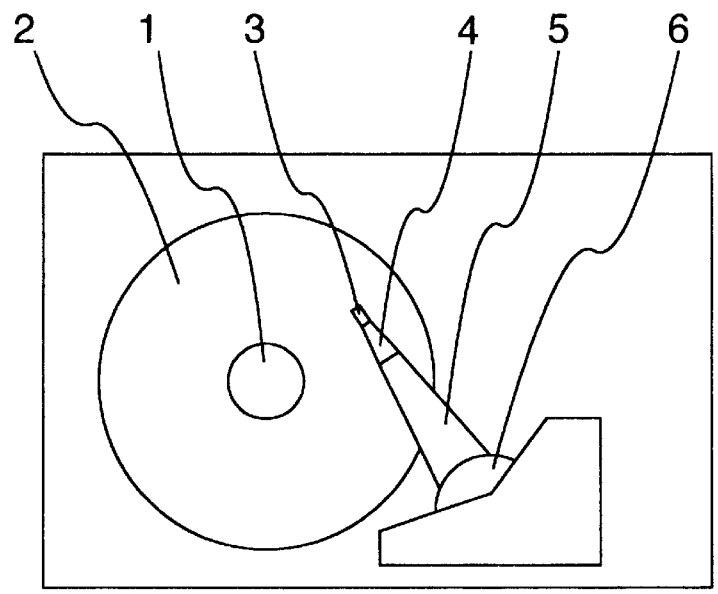
FIG. 1 schematically illustrates a magnetic disk apparatus according to an embodiment of the present invention.
Figure 4:
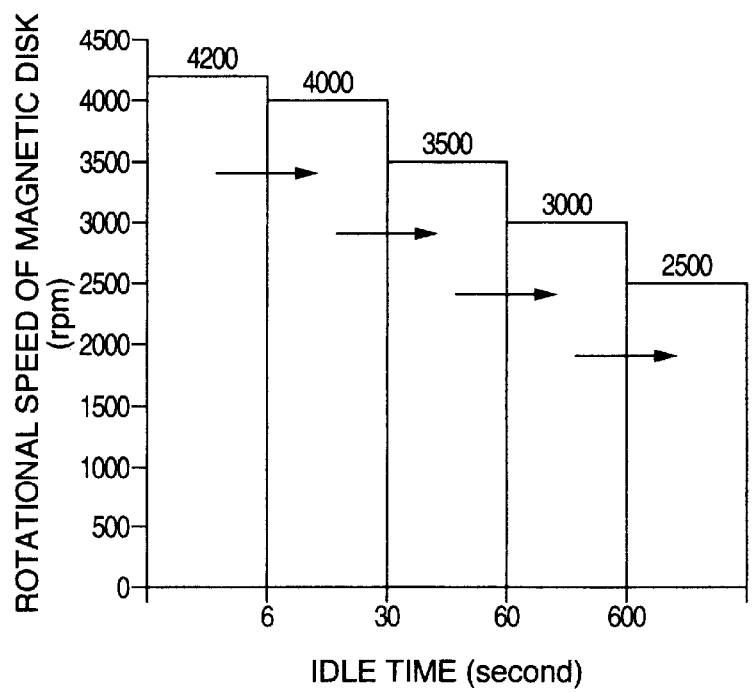
FIG. 4 is a graph showing how to reduce the rotational speed of the magnetic disk in response to an idle time according to the embodiment.
Figure 5:
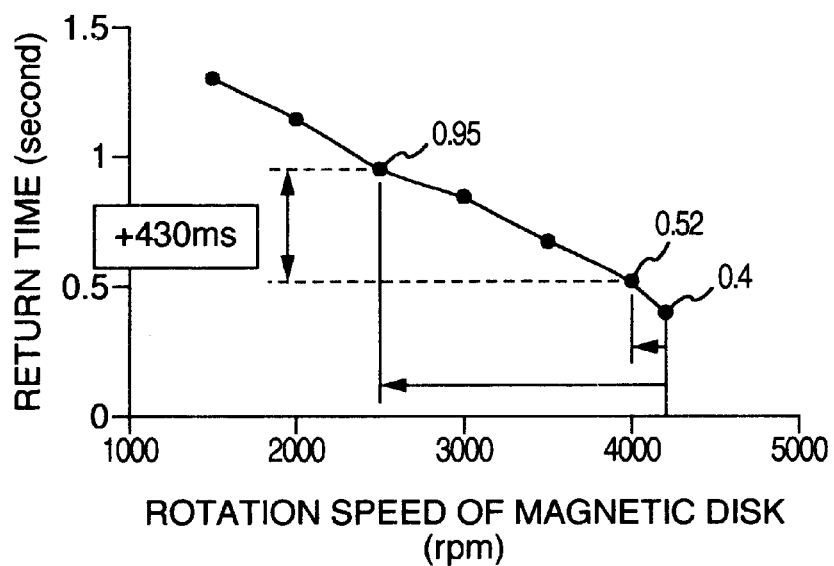
FIG. 5 is a graph showing a return time of the magnetic disk apparatus versus the rotational speed of the magnetic disk according to the embodiment.
Figure 6:
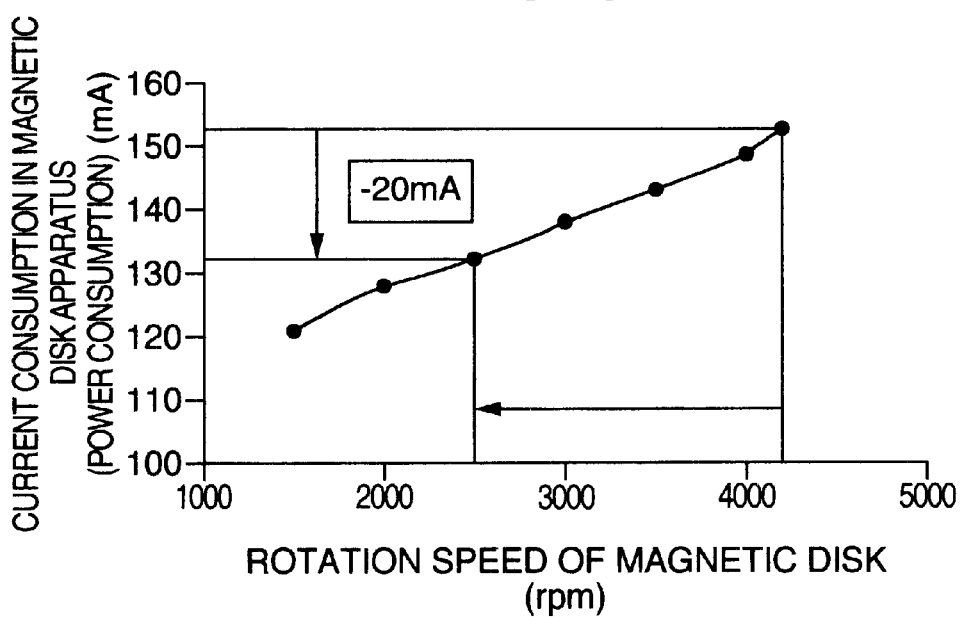
FIG. 6 is a graph showing current (power) consumption of the magnetic disk apparatus versus the rotational speed of the magnetic disk according to the embodiment.

A magnetic disk apparatus according to an embodiment of the present invention is now described in detail with reference to the accompanying drawings. FIG. 1 schematically illustrates a magnetic disk apparatus according to an embodiment of the present invention, FIG. 2 shows a flying surface of a magnetic head slider according the embodiment, FIG. 3 is a graph showing a flying characteristic of the magnetic head slider versus the rotational speed of a magnetic head according to the embodiment, FIG. 4 is a graph showing how to reduce the rotational speed of the magnetic disk in response to an idle time according to the embodiment, FIG. 5 is a graph showing a return time of the magnetic disk apparatus versus the rotational speed of the magnetic disk according to the embodiment, and FIG. 6 is a graph showing power consumption of the magnetic disk apparatus versus the rotational speed of the magnetic disk according to the embodiment.

FIG. 1 is a diagram illustrating the magnetic disk apparatus according to an embodiment of the present invention. The magnetic disk apparatus includes a magnetic disk 2 which is rotated by a spindle motor 1, a suspension 4 which resiliently supports a magnetic head slider 3 in which a magnetic head element is mounted, and a carriage arm 5 which supports the suspension 5 at one end thereof and is rotated by a voice coil motor 6 disposed at the other end thereof. The magnetic head slider 3 is moved to any track on the magnetic disk 3 by controlling the voice coil motor 6 and the magnetic head element performs recording and reproduction operation of data while the magnetic head slider 3 flies by means of viscous air flow produced by a high-speed rotation of the magnetic disk 2.

Figure 2:
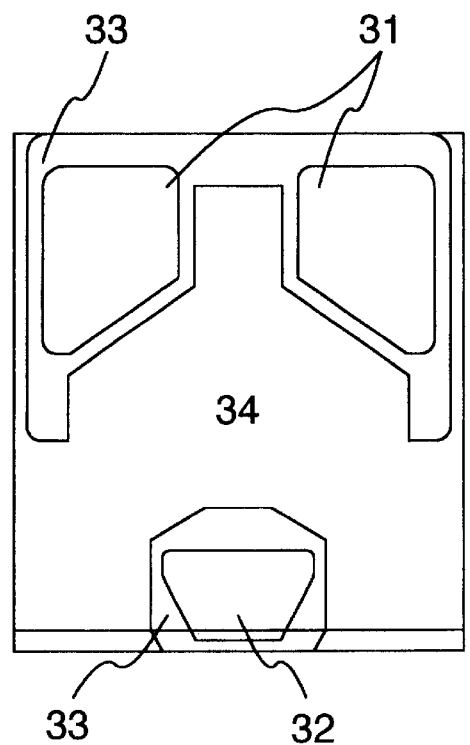
FIG. 2 shows a flying surface of a magnetic head slider according the embodiment.

FIG. 2 shows a flying surface of the magnetic head slider 3 according to the embodiment. The magnetic head slider 3 of the embodiment includes a pair of front pads 31 formed on the flying surface thereof on an inflow side of air positioned on the upper side of FIG. 2, a center pad 32 formed on the flying surface at an outflow end of air positioned on the lower side of FIG. 2 and in which the magnetic head element is mounted, a stepped bearing surface 33 formed to surround the pair of front pads 31 and the center pad 32 and recessed to about 200 nm in depth as compared with the pads, and a groove portion 34 recessed to about 1 μm in depth as compared with the pads, whereby the pads generate a positive pressure and the groove portion 34 generates a negative pressure. The magnetic head slider 3 is structured to fly over the magnetic disk 2 while keeping the balance of the positive and negative pressure and a pressing force of the suspension 4.

Figure 3:
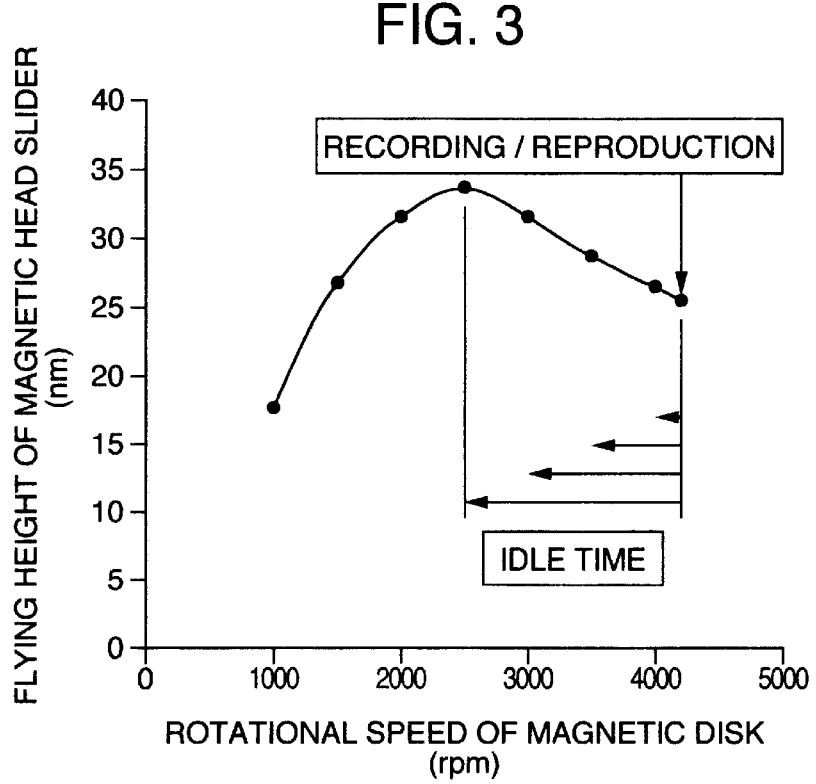
FIG. 3 is a graph showing a flying characteristic of the magnetic head slider versus the rotational speed of a magnetic head according to the embodiment.

FIG. 3 is a graph showing the flying characteristic of the magnetic head slider versus the rotational speed of the magnetic disk according to the embodiment. In positive and negative pressure sliders of the prior art, generally, when the rotational speed of the magnetic disk is increased, the flying height of the magnetic head slider is also increased and the magnetic head slider has been designed so that the flying height thereof is maximized at the rotational speed of the magnetic disk at the time of the recording and reproduction operation.

In the flying characteristic of the magnetic head slider versus the rotational speed of the magnetic disk according to the embodiment, however, as shown in FIG. 3, the flying height is maximized at 2500 rpm lower than the rotational speed of 4200 rpm of the magnetic disk at the time of the recording and reproduction operation.

This is because of the following reasons. In the magnetic head slider according to the embodiment, the effect of the positive pressure (operation of increasing the flying height) generated by the pads is large in the range of 0 to 2,500 rpm of the rotational speed of the magnetic disk and when the rotational speed of the magnetic disk is increased, the flying height of the magnetic head slider is also increased. In the range of 2,500 to 4,200 rpm of the rotational speed of the magnetic disk, the effect of the negative pressure (operation of reducing the flying height) generated by the groove portion is increased together with the effect of the positive pressure generated by the pads with the increase of the rotational speed of the magnetic disk and when the rotational speed of the magnetic disk is increased, the flying height of the magnetic head slider is made small. The flying height of the magnetic head slider is maximized at the rotational speed of 2,500 rpm of the magnetic disk due to the balance of the effect of the positive pressure (operation of increasing the flying height) and the effect of the negative pressure (operation of reducing the flying height). At this time, the magnitude of the negative pressure is determined on the basis of a depth, an area, a shape and the like of the groove portion.

FIG. 4 is a graph showing how to reduce the rotational speed of the magnetic disk in response to an idle time according to the embodiment.

In the magnetic disk apparatus of the embodiment, the magnetic disk is normally rotated at the rotational speed of 4,200 rpm at the time of the recording and reproduction operation and the rotational speed of the magnetic disk is reduced stepwise or gradually in accordance with the idle time length during the idling period. As shown in FIG. 4, the rotational speed of the magnetic disk is reduced from 4,200 to 4,000 rpm in the idle time of 6 seconds (when the idle time of 6 seconds elapses). Further, the rotational speed of the magnetic disk is reduced from 4,000 to 3,500 rpm in the idle time of 30 seconds. Furthermore, the rotational speed of the magnetic disk is reduced from 3,500 rpm to 3,000 rpm in the idle time of 60 seconds.

As described above, the rotational speed of the magnetic disk is reduced stepwise in response to the idle time and finally the rotational speed of the magnetic disk is reduced from 3,000 to 2,500 rpm in which the flying height of the magnetic head slider is maximized in the idle time of 600 seconds. Consequently, the flying height of the magnetic head slider can be increased and contact of the magnetic head slider with the magnetic disk can be avoided so that the reliability of the magnetic disk apparatus can be increased. It is a matter of course that when a processing instruction for reading or writing is received before the idle time of 30 seconds elapses after the elapse of the idle time of 6 seconds, the rotational speed of the magnetic disk is returned to 4,200 rpm from 4,000 rpm.

FIG. 5 is a graph showing a return time of the magnetic disk apparatus versus to the rotational speed of the magnetic disk according to the embodiment. The return time means the time required until the recording/reproduction operation can be made actually after a processing instruction for recording or reproduction has been received during the idling period. For example, the return time is determined by the time required until the rotational speed of the magnetic disk is returned to 4,200 rpm at the time of the recording/ reproduction operation or the time required to position the magnetic head slider on a predetermined track. The stepwise reduction of the rotational speed of the magnetic disk in response to the idle time is one distinctive feature of the present invention.

In the embodiment, the rotational speed of the magnetic disk is reduced from 4,200 to 4,000 rpm by 200 rpm in the idle time of 6 seconds. In this case, the return time is 520 msec. However, when the rotational speed of the magnetic disk has been reduced by 1,700 rpm to 2,500 rpm at a time during the idling period instead of the stepwise reduction of the rotational speed of the magnetic disk as in the embodiment, the return time requires 950 msec.

Accordingly, when the 4,200 rpm is reduced to the 4,000 rpm as in the embodiment, the return time is shortened by 430 msec as compared with the case where the 4,200 rpm is reduced to the 2,500 rpm at a time. The magnetic disk apparatus performs the recording/reproduction operation in the order of microseconds and accordingly the difference of 430 msec influences the performance of the magnetic disk apparatus greatly. In this manner, by reducing the rotational number of the magnetic disk stepwise in accordance with the idle time, the data processing performance of the magnetic disk apparatus can be maintained.

Further, when the idle time is long, the recording and reproduction frequency is low and accordingly it is permissible to lengthen the return time. That is, it is considered that it is permissible to reduce the rotational speed of the magnetic disk. Accordingly, in the present invention, when the idle time is as long as 600 msec, the rotational speed of the magnetic disk is reduced to 2,500 rpm.

In FIG. 5, the reason that the return time at the rotational speed of 4,200 rpm of the magnetic disk is 400 msec is that it takes time to load the magnetic head.

FIG. 6 is a diagram showing power consumption of the magnetic disk apparatus versus the rotational speed of the magnetic disk according to the embodiment. The power consumption is represented by the current consumption of the magnetic disk apparatus in the diagram. The magnetic disk apparatus according to the embodiment can reduce the rotational speed of the magnetic disk from 4,200 rpm to 2,500 rpm to thereby reduce the power consumption corresponding to 20 mA.

Figure 7:
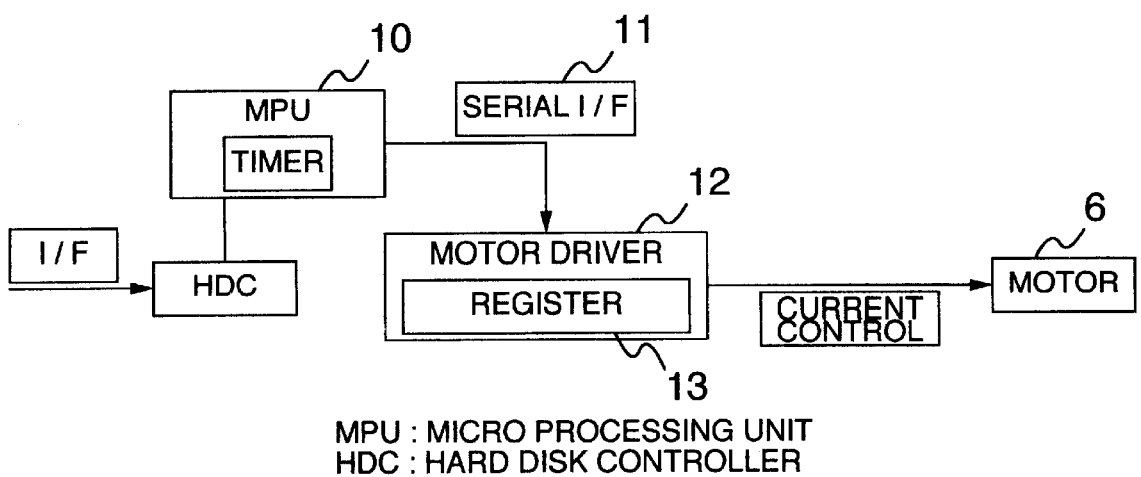
FIG. 7 is a control block diagram for reducing the rotational speed of the magnetic disk according to the present invention.

FIG. 7 is a control block diagram for reducing the rotational speed of the magnetic disk in the present invention. That is, the rotational speed of the magnetic disk can be controlled by the following procedures of (1), (2) and (3).

(1) The time (idle time) that recording or reproduction is not made is counted by a timer in an MPU 10.

(2) A value of the rotational speed of the magnetic disk is set to a register 13 of a motor driver 12 from the MPU 10 through a serial interface (I/F) 11 (serial transfer) in accordance with a length of the idle time.

(3) The motor driver 12 controls an additional current to a motor 6.

As described above, the present invention employs the magnetic head slider having the flying height maximized at the rotational speed of the magnetic disk lower than that at the time of the recording and reproduction operation and the rotational speed of the magnetic disk is reduced stepwise in accordance with the idle time, so that the power consumption can be reduced while the reliability and performance of the magnetic disk apparatus are maintained by increasing the flying height of the magnetic head slider.

What is claimed is:

1. A magnetic disk apparatus including a magnetic head slider in which a magnetic head element is mounted, a magnetic disk to which recording and reproduction of data are made by means of said magnetic head element, and a spindle motor which supports and rotates said magnetic disk, wherein said magnetic head slider has a flying characteristic that a flying height said magnetic head slider from said magnetic disk is increased by reducing a rotational speed of said magnetic disk to be lower than a rotational speed of said disk at a time of the recording and reproduction, and said apparatus comprises:

control means for, after completion of recording or reproduction to said magnetic disk by said magnetic head element, stepwise reducing the rotational speed of said magnetic disk in accordance with elapse of idle time until restart of the recording or reproductions.

2. A magnetic disk apparatus according to claim 1, wherein said control means comprises:

means for counting said elapse of idle time in which the recording or reproduction is not made by means of a timer in a microprocessor unit (MPU);

setting a register of a motor driver in accordance with a length of said idle time by serial transfer from said MPU; and controlling an additional current supplied to said spindle a motor by said motor driver.

3. A magnetic disk apparatus including a magnetic head slider in which a magnetic head element is mounted, a magnetic disk to which recording and reproduction of data are made by means of said magnetic head element, and a spindle motor which supports and rotates said magnetic disk, wherein said magnetic head slider has a flying characteristic that a flying height said magnetic head slider from said magnetic disk is increased by reducing a rotational speed of said magnetic disk to be lower than a rotational speed of said disk at a time of the recording and reproduction, and said apparatus comprises:

control means for, after completion of recording or reproduction to said magnetic disk by said magnetic head element, stepwise reducing the rotational speed of said magnetic disk in accordance with elapse of idle time until restart of the recording or reproduction wherein when a predetermined longest idle time elapses, the rotational speed of said disk is controlled to reach a rotational speed in which the flying height of the said magnetic head slider is at a maximum in said flying characteristic.

4. A magnetic disk apparatus according to claim 3, wherein said control means comprises:

means for counting said elapse of idle time in which the recording or reproduction is not made by means of a timer in a microprocessor unit (MPU);

setting a register of a motor driver in accordance with a length of said idle time by serial transfer from said MPU; and controlling an additional current supplied to said spindle a motor by said motor driver.

* * * * *